Patented Sept. 10, 1929.

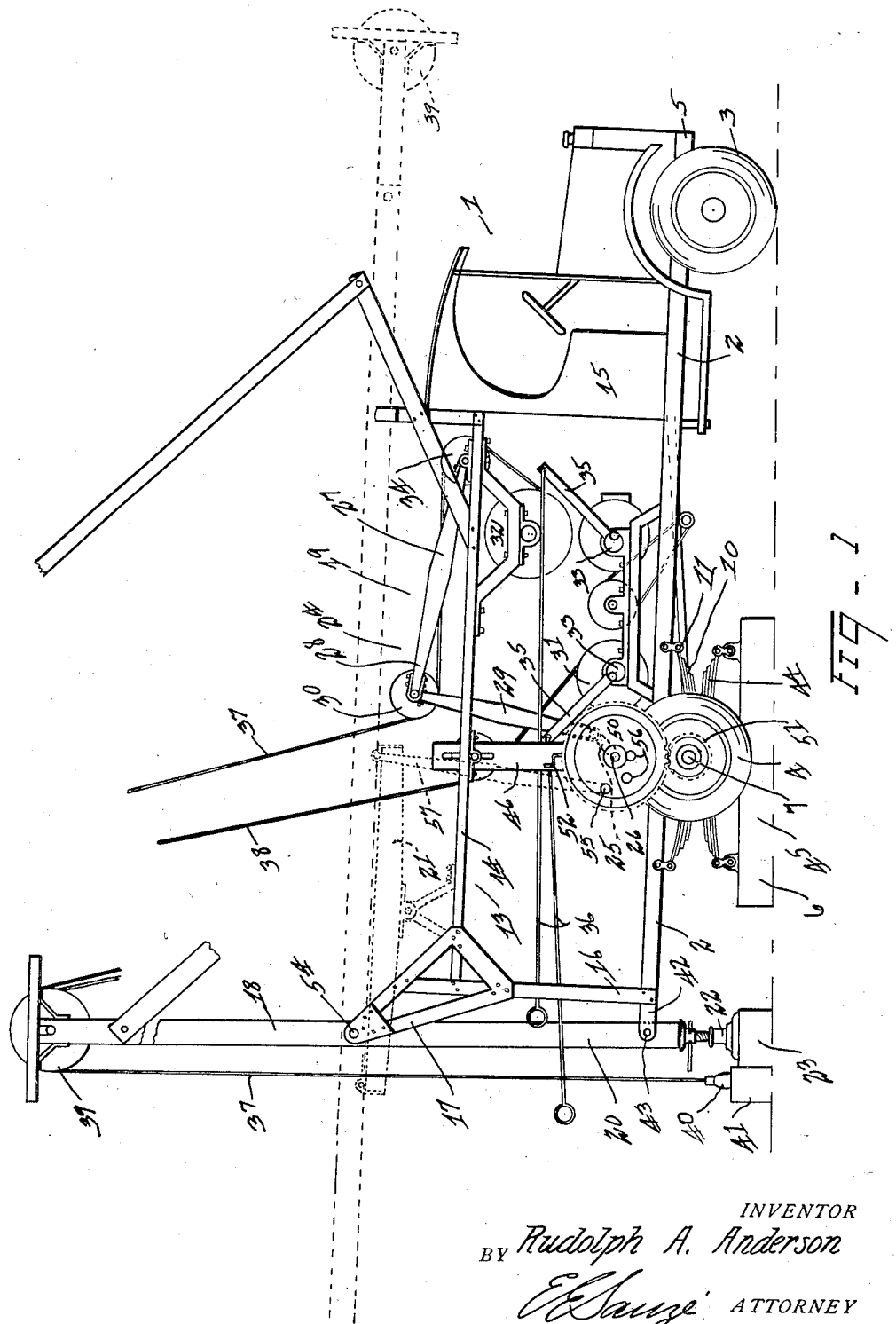

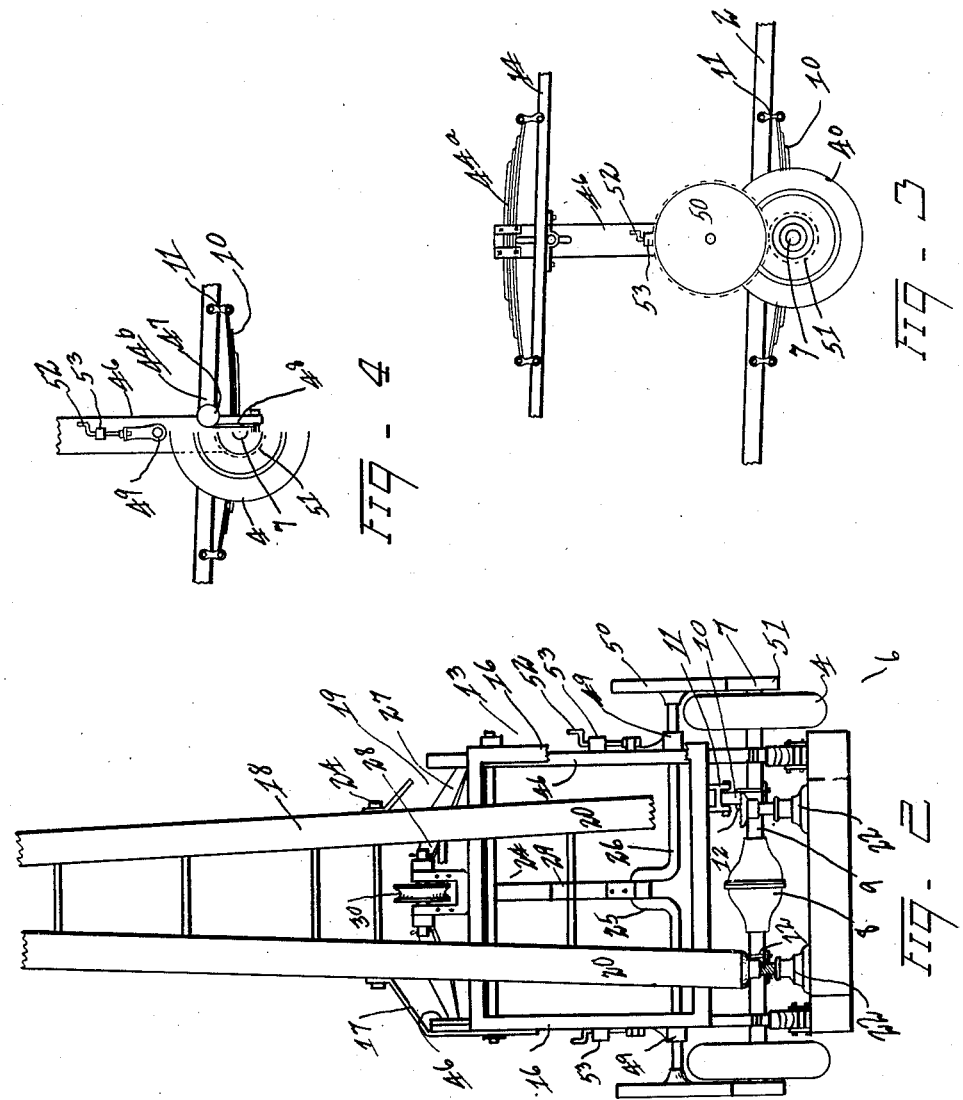

1,727,801

UNITED STATES PATENT OFFICE.

RUDOLPH A. ANDERSON, OF WALLA WALLA, WASHINGTON.

YIELDING POWER TAKE-OFF.

Application filed April 10, 1928. Serial No. 268,857.

This invention relates to yielding power take-offs and has as one of its objects to provide a power take-off having a yielding flexibility more particularly adapted to the spudding operation of drilling wells, and hence to well drilling machinery, to pile drivers, and to pump jacks, or the like.

A further object of the invention is to provide a yielding power take-off adapted for use with the driving mechanism of a motor vehicle whereby the speed of the vehicle may be utilized for rapid transportation, and the power of the motor used for the work.

A further object of the invention is to provide a yielding power take-off the yielding supports of the rear wheels thereof providing the flexibility, and the parts being arranged to utilize the drive wheels as fly wheels to provide for steady movement.

A further object of the invention is to provide a yielding power take-off having an easy means for disconnecting the driving mechanism from the spudding mechanism.

A further object of the invention is to provide a yielding power take-off that by its lightness and speed is capable of handling small jobs at great distances, at a financial gain, thus enabling the farmer to have his own water, art, at a reasonable price.

A further object of the invention is to provide a yielding power take-off which by its smooth flexible operation permits the use of such high grade parts as are contained in a motor driven vehicle to operate heavy duty machinery, such as enumerated above, and at the same time to use the variable speed controls, the starter, lights, etc.

A further object of the invention is to provide a yielding power take-off, whose flexibility permits the use of lighter parts in the construction of the machinery to be operated, with a consequent less cost to manufacture.

With these and other objects in view reference is now had to the accompanying drawings in which Fig. 1 is a side elevation of the device showing its application to a well drill;

Fig. 2 is a rear elevation thereof;

Fig. 3 shows a modified form of counter support for the drive wheels; and

Fig. 4 shows a second modification with part of the drive wheel cut away for the purpose.

Having reference to the drawings like numerals refer to like parts throughout the several views and the numeral 1 refers to a motor driven vehicle which may be of any type suitable for the purpose, preference being given, however, to a motor vehicle of the touring or truck type having a relatively long chassis 2.

The chassis is supported by steering wheels 3 and drive wheels 4 in the usual manner with a power unit, not shown, provided in the usual manner on the front end of the vehicle.

For the purpose of these specifications, the front end will be termed the driving end 5, that end carrying the motor, and the rear end of the vehicle will be termed the driven end 6, owing to the fact that the power is communicated to the drive wheels situated at the rear of the vehicle.

The driven end 6 includes, as the driving mechanism 6ª, the drive wheels 4, a power driven axle 7 extending laterally of the chassis, in the usual manner, and carrying the usual differential 8, the function of which needs no further description as it is old in the art, and a housing 9 for said axle affording a non-rotating member, to be used for a purpose to be explained.

The drive wheels 4 are yieldingly attached to the chassis by means of springs 10, (one only of which is shown) the springs being supported from the chassis by means of spring shackles 11 and secured to the housing by U bolts 12 in the usual manner of such construction.

For the purpose of this description the position of the wheels with respect to the chassis when under load, will be considered as a normal loaded position and this position will be maintained as will be noted as the description proceeds.

Securely mounted on the chassis and forming a part of the vehicle is a frame 13 rigidly attached thereto in the usual manner of such construction, and this frame consists of side rails 14 extending longitudinally of the vehicle and secured to the front end by attachment to the cab 15 thereof, or in any suitable manner as by a post, not shown, with the rear end supported by end posts 16 secured to the chassis and extended to carry derrick supporting arms 17 rigidly attached thereto, wherewith to pivotally support a derrick 18 (to be explained) when such derrick becomes a part of the operating mechanism 19.

The operating mechanism 19 referred to in this description will be considered as well drilling machinery but although a well drill will be described, let it be understood that the invention is not restricted to such mechanism, but is applicable to other mechanisms requiring a yielding resilient movement, such as pile driving mechanisms, or pump jacks or the like, the pile driving mechanism, as it well known, utilizing a derrick in a slightly modified form to act as guides, both derricks, however, having legs 20 utilized to support the derricks upon the ground, while in the case of the pump jack, other means may be used to replace said legs or a support may be supplied beneath the rear end of the chassis for the purpose.

In Fig. 1 a walking beam 21 is shown by finely dotted lines and this walking beam may form a part of the well drilling machinery or obviously be applied as a pumping jack. Screw jacks 22 are preferably used as a supporting means as such jacks may be adjusted to plumb or support the derrick, or chassis as the case may be, in either case a mud sill 23 may be utilized as a foundation for said supporting means.

In furtherance of the above, the device is primarily adapted to the above well drilling machinery, this machinery being typical, and for the purpose of this description, the well drilling machinery will be termed the operating mechanism 19, and this mechanism is operably mounted on the frame and consists primarily of a spudding mechanism 24 comprising a crank 25 formed as part of a crank shaft 26, spudding beams 27 pivotally mounted upon the side rails 14 of the frame in a manner to compensate for a free yielding movement of its opposite end 28, the spudding beam being extended rearward and having its opposite end pivotally attached to a pitman 29 which in turn is operably mounted on said crank, the crank shaft and pitman being operably and yieldingly attached to the driving mechanism 6ª and forming a driving means for the operating mechanism 19, with a spudding pulley 30 added at the juncture of said spudding arm and pitman for a purpose to be explained.

While the parts mentioned as the spudding mechanism 24 are brought into the claims, they are herewith disclaimed as such.

Other parts which go to make up the well drilling machinery and which will be referred to in describing the use of the invention, or incorporated into the assembly, consist of a sand drum 31, a main drum 32, eccentric bearings 33, heel pulley 34, operating levers 35, operating rods 36, main cable 37, a sand cable 38, crown pulley 39, boring tool 40, and well casing 41 together with other parts of minor importance.

Referring back to the supporting means, the derrick 18 is pivotally secured to the frame by means of the derrick supporting arms 17 while a yoke 42, positioned at the lower end of the frame, is utilized to secure the leg 20 of the derrick by the insertion of a pin 43, by which means the supporting legs form an integral part of the frame, and hence when these legs are raised by the screw jacks 22, the jacks adjustably support the driven end 6, and by raising the driven end the load is removed from the drive wheels 4.

It is well known that upon raising the rear end of a vehicle of this nature that the load will be removed from the drive wheels and that the drive wheels will drop a certain distance below the chassis due to the relaxation of the springs 10, the movement of the shackles 11 which support the springs, augmented by the weight of the driving mechanism 6ª. To overcome this and to utilize the springs as part of the yielding power take-off, a means is provided whereby to yieldingly maintain the normal loaded position of the wheels, and other driving mechanisms, when free of load, and this means consists of a counter spring 44 arranged in a reverse position to the springs 10, supporting the driving mechanism, thereby counter-acting the above mentioned dropping action. The counter springs 44 preferably rest upon a block 45 forming a firm foundation which foundation augments the foundation provided by the said mud sill 23 in the support of the vehicle.

Obviously, other means of counter-acting this effect may be provided, two of such equivalent forms being shown in Figs. 3 and 4, that shown in Fig. 3 having counter-acting springs 44ª attached to the housing 9 of the driving mechanism 6ª through the medium of cross heads 46 secured to said springs 44ª and and said housing 9, with the other means consisting of snubbers 44ᵇ each having a housing 47 containing a strap 48 under tension, which strap is extended to be secured to the axle or housing wherewith to accomplish the same purpose.

It is further obvious that the tension of the counter-acting member, as when snubbers are used, may be regulated in the usual manner, and also that any suitable means may be used to regulate the tension of the counter-acting springs 44 and 44ª, and as such means are old in the art, further description thereof is deemed unnecessary.

By means of these counter-acting devices, the driving mechanism is yieldingly supported for movement practically in a vertical arc, and for the purpose of communicating the power to the operating mechanism 19 the cross heads 46 are utilized to mount the crank shaft 26, and the cross heads are slidably mounted in the side rails 14 for vertical yielding movement with the driving mechanism, and the crank shaft is carried by slidably and adjustably mounted journals 49 arranged in the cross heads.

The crank shaft is provided on its outer end preferably with spur gears 50 and these spur gears are adapted to mesh with spur pinions 51 secured to the driving mechanism, the spur pinions being preferably attached to the outer face of the drive wheels, the drive wheels and pinions by their weight, forming a fly wheel wherewith to provide for smooth action of the parts.

The sliding journals 49 are movable in a radial line extending from the center of the driving mechanism, movement being by means of a threaded crank 52 attached to the journals, and threadedly engaging a collar 53, secured to the cross heads for the purpose, by which means the driving gears may be engaged or disengaged, engaged for the purpose of operating the spudding mechanism, and disengaged for transportation purposes.

It will now be noted that the driving mechanism 6ª is supported in yielding suspense and that as the cross heads are secured to the housing, they will have the identical vertical movement of the driving mechanism, and therefore that the gears will remain in mesh during operation. Consequently, when a strain is placed upon the spudding beams 27 and the spudding pulley 30 during operation, that that strain will be absorbed by the supporting springs to eliminate a sudden jar, the yielding movement of the driving mechanism being imparted to the spudding mechanism.

In use the vehicle is backed to its proper position for work and, in a case of a well drill, the derrick is raised from its place of rest (shown by the dotted lines in Fig. 1) on the pivotal points 54 to the vertical position shown by the solid lines in Figs. 1 and 2.

The mud sill is now placed in position directly beneath the legs of the derrick and the derrick is raised and plumbed at the same time by the jacks, raising being to a height that will remove the drive wheels a sufficient distance from the ground to enable the counteracting springs 44 to be inserted thereunder, the jacks then lowering the vehicle to a position approximating the equalization brought about as the effect of both springs.

The spur gears, and with them the crank shaft, are now lowered by the cranks attached to the cross heads for the purpose, until the teeth of the spur gear properly mesh with the teeth of the spur pinions, and when this is accomplished, the take-off is ready for operation.

The power is now turned on in the usual manner which, passing through the differential, causes the rotation of the drive wheels. As the spur gears are rigidly secured to the crank shaft an equal power is applied through the spur pinions to both of said gears regardless of the fact of the differential, thus utilizing the full strength of that member In the case of a well drill performing the spudding operation, the cable 37 runs from the main drum 32 over the heel pulley 34 and under the spudding pulley 30 and thence over the crown pulley 39 and down to the well 41. It is now obvious that as the driving mechanism is put into operation, that the pitman will move up and down thus moving the spudding pulley to alternately shorten and lengthen the cable.

It is a well known fact that the spudding tools have comparatively great weight and when the spudding action takes place, i. e., shortening and lengthening the cable, that the strain ordinarily is so great that when fixed to rigid driving machinery, this machinery must be made excessively strong to stand this strain and hence by the use of the yielding power take-off, the sudden strain is taken care of, enabling lighter machinery to be employed, and making it possible to utilize the finally built machinery of a motor vehicle without undue strain thereon, and in addition having the advantage of the various speeds obtained from any motor vehicle.

The spur gear is provided with a crank pin 55 with sockets 56 arranged in a manner to provide different leverages, and pitmans 57 may be attached to these pins to drive other machinery such as the walking beam 21 above mentioned.

By means of a yielding power-source, the use of manila rope as a line can be dispensed with and the more substantial, less expensive and less bulky wire cable used in its stead, as the resiliency afforded by the rope is now provided for, and further, there can be no regulation of the spring of the rope while the tension of the springs can obviously be regulated by the use of the screw jack.

By the use of this device, associated with a power driven machine, the expense of an extra engine is avoided and much reserve power is obtained as the engine of the vehicle will develop a minimum of about 20 horse power, while the present additional engine used in this work will develop about 8 horse power only.

Having thus described my invention, I claim—

1. In a yielding power take-off, the combination with a motor driven vehicle, comprising a driving end and a driven end, and provided with a driving mechanism consisting of a power driven axle, a housing therefore, and drive wheels yieldingly attached to said vehicle, said wheels being normally positioned when under load, of a frame rigidly secured to said vehicle and provided with side rails, a well drilling mechanism mounted on said frame and including a spudding mechanism, and a derrick adapted to support said driven end, a counter-acting spring positioned and adapted to yieldingly maintain the normal loaded position of said driving mechanism when free of load, a driving means for said operating mechanism operably attached to said driving mechanism, and adapted to impart the yielding movement of the driving mechanism to the spudding mechanism, and means to engage or disengage the driving mechanism and the spudding mechanism.

2. In a yielding power take-off, the combination with a motor driven vehicle, comprising a driving end and a driven end, and provided with a driving mechanism consisting of a power driven axle, a housing therefore, and drive wheels yieldingly attached to said vehicle, said wheels being normally positioned when under load, of a frame rigidly secured to said vehicle and provided with side rails and end posts, a well drilling mechanism mounted on said frame and including a spudding mechanism, and a derrick, said derrick being attached to said end posts and provided with legs adapted to support said driven end, means to rigidly adjust and secure the supporting means said means being adapted to remove the load from the drive wheels and to plumb said derrick, a counter-acting spring positioned and adapted to yieldingly maintain the normal loaded position of said driving mechanism when free of load, and means to support said spring, a drive shaft operably attached to said spudding mechanism and said driving mechanism and journalled for movement with said driving mechanism, and adapted to impart a yielding movement to the spudding mechanism, and means to engage or disengage the driving mechanism and the spudding mechanism.

3. In a yielding power take-off, the combination with a motor driven vehicle, comprising a driving end and a driven end, and provided with a driving mechanism consisting of a power driven axle, a housing therefore, and drive wheels yieldingly attached to said vehicle, said wheels being normally positioned when under load, of a frame rigidly secured to said vehicle and provided with side rails and end posts, said posts carrying derrick supporting arms rigidly attached thereto, a well drilling mechanism mounted on said frame and including a spudding mechanism consisting of a crank, a spudding pulley and a spudding beam, and having a derrick secured to said supporting arms and provided with legs adapted to support said driven end, a mud sill, and means associated therewith to adjust and secure the supporting means, said means being adapted to remove the load from the drive wheels and to plumb said derrick, a counter-acting spring positioned and adapted to yieldingly maintain the normal loaded position of said driving mechanism when free of load, and means to support said spring, cross heads slidably mounted in said frame, and secured to the driving mechanism for yielding movement therewith, a drive shaft journalled in said cross heads and operably connected with said spudding mechanism and said driving mechanism, and adapted to impart the yielding movement of said driving mechanism to said spudding mechanism and means mounted on said cross heads to engage or disengage the driving mechanism and the spudding mechanism.

4. In a yielding power take-off, the combination with a motor driven vehicle, comprising a driving end and a driven end, and provided with a driving mechanism consisting of a power driven axle, a housing therefore, and drive wheels yieldingly attached to said vehicle, said wheels being normally positioned when under load, of a frame rigidly secured to said vehicle and provided with side rails and end posts, said end posts carrying derrick supporting arms rigidly attached thereto, a well drilling mechanism mounted on said frame and including a spudding mechanism consisting of a crank, a spudding pulley, and a spudding beam, and having a derrick pivotally secured to said end posts and said arms, and provided with legs adapted to be positioned to serve as a support for said driven end, a mud sill, and means associated therewith to adjust and secure said supporting means, said means being adapted to remove the load and to plumb said derrick, a counter-acting spring positioned and adapted to yieldingly maintain the normal loaded position of said driving mechanism when free of load, and means to support said spring, cross heads slidably attached to said side rails and secured to the housing for yielding movement therewith, a drive shaft mounted in journals in said cross heads and operably attached to said spudding mechanism and said driving mechanism, and adapted to impart the yielding movement of said housing to said spudding mechanism, and means mounted on said cross heads and operably connected with said journals to engage or disengage said driving mechanism and the spudding mechanism.

5. In a yielding power take-off, the combination with a motor driven vehicle, comprising a driving end and a driven end, and provided with a driving mechanism consisting of a power driven axle, a housing therefore, and drive wheels yieldingly attached to said vehicle, said wheels being normally positioned when under load, of a frame rigidly secured to said vehicle, and provided with supporting legs at its driven end, a well drilling mechanism mounted on said frame and including a spudding mechanism consisting of a crank shaft, a spudding beam and a spudding pulley, means to rigidly and adjustably secure the supporting means, said means being adapted to remove the load from the drive wheels, means to yieldingly maintain the normal loaded position of said driving mechanism when free of load, cross heads slidably mounted in said frame, and secured to the housing for yielding movement therewith, a crank shaft journalled in said cross heads and provided on its outer ends with spur gears, adapted to engage spur pinions mounted on said axle, and having its crank operably connected with the spudding mechanism, and adapted to impart the yielding movement of said driving mechanism to said spudding mechanism when said spudding mechanism is under strain, and means mounted on said cross heads and operably connected with said journals to engage or disengage said driving mechanism and the spudding mechanism.

6. In a yielding power take-off, the combination with a motor driven vehicle, comprising a driving end and a driven end, and provided with a driving mechanism consisting of a power driven axle, a housing therefore, and drive wheels yieldingly attached to said vehicle, said wheels being normally positioned when under load, of a frame rigidly secured to said vehicle, and provided with supporting legs at its driven end, a well drilling mechanism mounted on said frame and including a spudding mechanism consisting of a crank shaft, a spudding beam and a spudding pulley, means to rigidly and adjustably secure the supporting means, said means being adapted to remove the load from the drive wheels, means to yieldingly maintain the normal loaded position of said driving mechanism when free of load, cross heads slidably mounted in said frame, and secured to the housing for yielding movement therewith, a crank shaft journalled in said cross heads and provided on its outer ends with spur gears adapted to engage spur pinions mounted on said axle, and having its crank operably connected with the spudding mechanism in a manner to compensate for the yielding movement and adapted to impart the yielding movement of said driving mechanism to said spudding mechanism when said spudding mechanism is under strain, and means mounted on said cross heads to manually advance or retract said journals wherewith to engage or disengage said driving mechanism and the spudding mechanism.

7. In a yielding power take-off, the combination with a motor driven vehicle, comprising a driving end and a driven end, and provided with a driving mechanism consisting of a power driven axle, a housing therefore, and drive wheels yieldingly attached to said vehicle, said wheels being normally positioned when under load, of a frame rigidly secured to said vehicle and provided with supporting legs at its driven end, a well drilling mechanism mounted on said frame and including a spudding mechanism consisting of a crank shaft, a spudding beam and a spudding pulley, means to rigidly and adjustably secure the supporting means, said means being adapted to remove the load from the drive wheels, means to yieldingly maintain the normal loaded position of said driving mechanism when free of load, cross heads slidably mounted in said frame, and secured to the housing for yielding movement therewith, a crank shaft adjustably journalled in said cross heads and provided on its outer ends with spur gears, adapted to engage spur pinions mounted on said axle, and having its crank operably connected with the spudding mechanism, and adapted to impart the yielding movement of said driving mechanism to said spudding mechanism when said spudding mechanism is under strain, means mounted on said cross heads to manually advance or retract said journals to engage or disengage said driving mechanism and the spudding mechanism.

8. In a yielding power take-off, the combination with a motor driven vehicle, comprising a driving end and a driven end, and provided with a driving mechanism consisting of a power driven axle, a housing therefore, and drive wheels yieldingly attached to said vehicle, said wheels being normally positioned when under load, of a frame rigidly secured to said vehicle and provided with supporting legs at its driven end, a well drilling mechanism mounted on said frame and including a spudding mechanism consisting of a crank shaft, a spudding beam and a spudding pulley, means to rigidly and adjustably secure the supporting means, said means being adapted to remove the load from the drive wheels, means to yieldingly maintain the normal loaded position of said driving mechanism when free of load, cross heads slidably mounted in said frame, and secured to the housing for yielding movement therewith, a crank shaft adjustably journalled in said cross heads and provided on its outer ends with spur gears, adapted to engage spur pinions mounted on said axle, and having its crank operably connected with the spudding mechanism, and adapted to impart the yielding movement of said driving mechanism to said spudding mechanism, when said spudding mechanism is under strain, and arranging said spur pinion and the drive wheels to provide fly wheels, means mounted on said cross heads to manually advance or retract said journals to engage or disengage said driving mechanism and the spudding mechanism.

9. In a yielding power take-off, the combination with a motor driven vehicle comprising a driving end and a driven end and provided with a driving mechanism yieldingly attached to said vehicle and having driving wheels, said wheels being normally positioned when under load, an operating mechanism mounted on said vehicle, means to rigidly support said vehicle and to remove the load from said wheels, means consisting of an opposing spring to yieldingly maintain the normal loaded position of the wheels when free of load, and a driving means operably attached to said operating mechanism, and operably attached to the driving means for yielding movement therewith.

In testimony whereof I affix my signature.

RUDOLPH A. ANDERSON.